US009670439B2

(12) United States Patent
Aregger et al.

(10) Patent No.: US 9,670,439 B2
(45) Date of Patent: Jun. 6, 2017

(54) CLEANING INNER PART OF HOT BEVERAGE SYSTEM WITH A CLEANING CAPSULE

(71) Applicant: NEORETA GMBH, Buchs SG (CH)

(72) Inventors: Willi Aregger, Maienfeld (CH); Rudi Nitzlnader, Mauren (LI); Heiner Graf, Werdenberg (CH)

(73) Assignee: NEORETA GMBH (CH)

( * ) Notice: Subject to any disclaimer, the term of this patent is extended or adjusted under 35 U.S.C. 154(b) by 199 days.

(21) Appl. No.: 14/400,283

(22) PCT Filed: May 10, 2013

(86) PCT No.: PCT/CH2013/000080
§ 371 (c)(1),
(2) Date: Nov. 10, 2014

(87) PCT Pub. No.: WO2013/166615
PCT Pub. Date: Nov. 14, 2013

(65) Prior Publication Data
US 2015/0141313 A1    May 21, 2015

(30) Foreign Application Priority Data

May 9, 2012   (CH) ......................................... 656/12

(51) Int. Cl.
| B08B 3/04 | (2006.01) |
| A47J 31/60 | (2006.01) |
| C11D 17/04 | (2006.01) |
| C11D 17/00 | (2006.01) |
| C11D 3/14 | (2006.01) |
| C11D 7/10 | (2006.01) |
| C11D 11/00 | (2006.01) |
| B65D 85/804 | (2006.01) |

(52) U.S. Cl.
CPC ........... *C11D 17/0039* (2013.01); *A47J 31/60* (2013.01); *C11D 3/14* (2013.01); *C11D 7/10* (2013.01); *C11D 11/0023* (2013.01); *C11D 11/0041* (2013.01); *C11D 17/041* (2013.01); *B65D 85/8043* (2013.01)

(58) Field of Classification Search
None
See application file for complete search history.

(56) References Cited

U.S. PATENT DOCUMENTS

| 4,770,666 A * | 9/1988 | Clauss ................. C11D 3/3945 510/277 |
| 5,534,178 A * | 7/1996 | Bailly .................... C11D 17/06 510/224 |
| 5,656,583 A * | 8/1997 | West ....................... A47J 31/60 134/22.17 |
| 5,888,313 A | 3/1999 | West |
| 2002/0077264 A1* | 6/2002 | Roberts .................. B65D 75/38 510/296 |
| 2003/0114332 A1* | 6/2003 | Ramcharan ........ C11D 17/0004 D17/4 |
| 2010/0119561 A1* | 5/2010 | Spindler .................. A61K 8/02 424/401 |

FOREIGN PATENT DOCUMENTS

| EP | 1384680 A2 * | 1/2004 |
| EP | 1591515 A1 | 11/2005 |
| EP | 1829954 A1 | 9/2007 |
| FR | 2924123 A1 * | 5/2009 |
| JP | 03128315 A * | 5/1991 |

* cited by examiner

*Primary Examiner* — Lorna Douyon
(74) *Attorney, Agent, or Firm* — Morriss O'Bryant Compagni, PC

(57) ABSTRACT

A method of cleaning the inner part of hot beverage system, in particular a coffee machine, with a cleaning capsule is disclosed. The capsule is inserted into the hot beverage system, the capsule defining a hollow space containing a cleaning material and an inert filling material.

19 Claims, No Drawings

CLEANING INNER PART OF HOT BEVERAGE SYSTEM WITH A CLEANING CAPSULE

CROSS-REFERENCE TO RELATED APPLICATIONS

This application is a national phase entry under 35 U.S.C. §371 of PCT/CH2013/000080 filed on May 10, 2013, which claims priority to Swiss Patent Application 00656/12 filed on May 9, 2012, the entirety of each of which is incorporated by this reference.

FIELD OF THE INVENTION

The invention is related to a cleaning Capsule (or Pad) analog and the use of a cleaning Capsule (or Pad) analog.

STATE OF THE TECHNOLOGY/PRIOR ART

The market for portioned coffee in the form of capsules or pads is increasing strongly. This format is extremely user-friendly and the cost of the coffee machines is low. Users of such coffee machines are not aware that there are coffee grinds and microbes remaining in the front part of the machine, but also chalk in all parts of the machine. Coffee grinds, microbes and other materials, which cannot be cleaned by water only, can contaminate the area of the actual brewing-process, where the capsule or pad is placed at the front end of the machine. There are many solutions to clear away the chalk, but hardly any to clean the coffee grinds and microbes. The consequent contamination can have a negative influence on the taste of the coffee or other hot drinks. It has to be removed to ensure a permanent good quality of the coffee.

In U.S. Pat. No. 5,888,313 there is a description of a cleaning bag, similar to a tea bag, consisting of an upper and lower filter paper coat and a cleaning material. These cleaning bags are meant for the use in coffee and tea-machines. The two filter papers are sealed and they create a bag. The content of this bag is a cleaning substance in a powder format. It includes highly effective cleaning chemicals such as trisodium phosphate and sodium silicate, but also soda. During the cleaning process the soda reacts by bubbling and producing foam, which strengthens the cleaning process. This cleaning bag is however only for use in filter machines. It is not meant for systems that produce hot drinks under pressured hot water. The cleaning substance will dissolve totally in the hot water, but without pressure there is no strong cleaning effect. The hot water with this cleaning substance does not find all potentially contaminated parts of the machine in this case. The paper used to create the bag is not strong enough for a cleaning process involving pressure. The paper could burst and damage the machine.

SUMMARY OF THE INVENTION

The present invention provides a solution to clean beverage machines that works with hot water under pressure for coffee capsule machines in particular. The cleaning process has to be fast, rigorous and safe. As far as possible, all water insoluble particles of coffee grinds, microbes and other contaminants should be eliminated. There is an additional aspect of the invention. The cleaning capsule should have at least the same structural stability as the normal coffee capsule used in the system.

DETAILED DESCRIPTION OF THE INVENTION

The invented cleaning capsule has two types of materials in its hollow space. Firstly there is the cleaning material dispensed in accordance with the formula. Secondly there is a chemically inert filling material. This filling material is passive in connection with the cleaning material, water and air and it has no function in the chemical cleaning process. The filling material does not react and cannot react. It is stable under the given conditions, not reacting with potential reaction partners such as educts, products used for the cleaning process, water or air. The cleaning material, in accordance with the formula that is designed to clean the parts of the coffee machine where coffee grinds or microbes are collecting, is of low volume. It is not filling the hollow space of the capsule. The flow and the flow path of the hot water, just after it has passed the cleaning capsule and has been connected with the cleaning substances, has to be lead to all relevant potentially contaminated parts of the machine. This has to be designed individually for every capsule system, since the capsule systems and the flow of liquidity in the machines are different. The flow process has also to be individually designed for different types of beverage for example tea, hot chocolate or soup in case of machines, which can produce different types of beverage. In all these cases the filling material is needed to complement the cleaning material and thus the whole hollow space of the capsule is occupied. Since the filling material is inert, there is no, or can be only, a minimal reaction with the cleaning material, water or air. The filling material should have the same, or nearly the same, qualities and characteristics as coffee grounds in relation to hot water and its flow characteristics. After the cleaning material has been dissolved in the hot water in the machine where usually the scalding process occurs, the cleaning material/hot water mix will be rinsing all parts/alcoves of the front end of the machine, which can be polluted during and after the scalding process. The filling material does hold the capsule physically stable, since the capsule remains filled. The filling material prevents the capsule from deforming.

The favored aggregate condition of the filling material is a solid matter/original substance. But it is also thinkable that the filling material could be in fluid or gas form.

If the filling material is a solid matter/original substance, it might favorably also has the capability of swelling when getting in contact with hot water, similar to the coffee grounds. In this case the filling material will have to be exactly portioned.

The volume cannot become bigger than the capacity of the capsule. The capsule or its cover may not burst. The filling material will best possible fill out the closed hollow space of the capsule, such as the flow rate of the hot water is optimized. The filling material is creating a resistance, which enables the best possible flow rate for the hot water, which by then will be contaminated with the cleaning material. The grain size of the filling material and the allocation of the grain size in the capsule must also be optimized. This optimizing process will have to be done individually for different substances and for different capsule systems with experiments.

The degree of swelling of the filling material, when not limited in space and when getting in contact with water is favorably factor 1.1 to 1.8, more favorably factor 1.2 to 1.6, and optimal with factor 1.3 to 1.4 relative to the dry filling material. These factors relay to the degree of swelling of milled coffee. The filling material must have similar characteristics as milled coffee.

The flow rate of the hot water through the swelled filling material should be similar to the flow rate through the coffee powder and coffee grounds in a filled capsule. This will enable that the cleaning material, which is solubilized in the hot water, will find the same path within the machine like the scalded coffee and it will reach all polluted or contaminated areas of the machine.

The filling material advantageously is a not water soluble material. It can be a nonorganic or organic substance but it can also be a synthetic material. If it is an organic substance, it favorably will be composed by organic fibers. Nonorganic substances can be such as mineral material like sand or clay. Organic substances can be such as cellulose, which have similar swelling characteristics as coffee powder and they are biodegradable. We could also think of Styrofoam or synthetic granulate material/pellets. All these filling substances have the following common characteristics: they are inert when coming in contact with hot water or with the cleaning material. Ideally the filling material is of different specific gravity to coffee powder. This would protect users from mistaking the cleaning capsule for the coffee capsule.

A filling material in granulate form can be an advantage, because the hot water can rinse the full volume of the capsule and remove the cleaning material from the filling material in the capsule. In addition turbulences can be avoided.

In one embodiment, the synthetic filling material has the function of a carrier material for the cleaning substances. The cleaning material typically will have a different powder density than the filling material. As a consequence these two materials separate within the hollow space of the capsule. This is a disadvantage, since the uniform solubility of the hot fluid cleaning material can be affected. One possible solution is to adhere the cleaning material to the synthetic granulate in a water soluble way.

The cleaning material is adhered on the surface of the filling material. A homogeneous coating can be achieved, when the cleaning material is sprayed on the filling material. Since the hot water is rinsing the whole hollow space of the capsule, it will also rinse the entire surface of granulate. The cleaning material will dissolute completely.

Another favorable alternative is a cleaning capsule with a stronger casing of the capsule, which replaces the stabilizing effect of the filling material of the cleaning capsule. In this case the deformation protection and elastic stability is not, or not only, provided by the filling material, but also by the strength of the casing or the cover of the capsule. In this case the filling material does not have to protect the casing from deforming.

Another favorable alternative is a cleaning material, which produces oxygen as soon as it gets in contact with water. Oxygen is a strongly reactive substance, which helps to reduce contamination and to sanitize the inner parts of the machine.

A further advantage can be achieved, when the cleaning material contains reactive agents that are able to compound with chalk. In this case contaminations with chalk can be removed from inside the machine.

Advantageously the portion of cleaning material in the capsule is less than 3 g, favorably less than 2 g, most favorably less than 1.5 g. This apportioning of the cleaning material makes sure, that the entire volume of it will be dissolved by the hot water during the rinsing process. An overdose of cleaning material has also to be avoided. The portion of cleaning material must exactly fit for the cleaning process. It must be just enough, but not more to clean the scalding part of the machine.

Advantageously the composition of filling and cleaning material has a specific gravity which is either smaller than 1 g/cm3, favorably smaller then 0.7 g/cm3 and most favorably smaller then 0.5 g/cm3 or more than 2 g/cm3, favorably more than 3 g/cm3, and most favorably more than 4 g/cm3. A user of a cleaning capsule will be warned or at least aware, that the user is not using a coffee capsule, since the cleaning capsule is either much heavier or much lighter as the coffee capsule.

It may be an advantage to design the cleaning capsule in a different color. The color would favorably be an untypical one for hot beverages. Signal colors like red, green, purple or even white would have a strong signal effect. In this case the user is signaled that he is just now using a cleaning capsule, not a coffee capsule.

In a further favorable alternative the composition of cleaning and filling material would also contain a water-soluble food color. The user will realize the unusual color of the hot cleaning liquid in his cup, which is different to the expected drink. This will protect him from drinking it.

The food coloring most favorable for this is chlorophyll. Its color is strongly green and it helps the cleaning liquid to become neutral in taste and in smell. This neutrality upgrades the quality of the next hot drink after the cleaning process.

Another safety provision is to wrap the cleaning capsule in foil, ideally a signal colored foil. If the user has to perform an additional unpacking process, this will remind him or her of the specialty nature of the capsule in hand, as a cleaning capsule and not a coffee or a different hot beverage capsule.

Advantageously the filling material takes 90% of the volume of the hollow space, ideally at least 95%, and most favorably at least 97%. Thereby, an inside pressure can be produced after the filling material has swollen up. This inside pressure enables the hot water to flow through the capsule in a similar way as it does in the coffee capsule.

Advantageously at this point, the hollow space contains such a portion of cleaning material, so that a specific concentration of cleaning material results in a given volume of hot water. This concentration is between 0.3 to 2 weight percent, ideally between 0.4 to 1.5 weight percent, and most favorably between 0.5 to 1 weight percent. This concentration is strong enough to clean reliably any contamination in all relevant parts inside the machine. This concentration also prevents an overdose of cleaning material.

Advantageously the given volume of hot water accords with 0.5 to 3 times, ideally 0.7 to 2 times and most favorably 0.9 to 1.1 times to the volume of water conducted through the capsule with extraction commodity. These volume relations make the use of cleaning capsules easy, since they are similar to the volumes used to make a hot drink, which means the volumes correspond to a full cup/lungo drink.

Another aspect of this invention is a cleaning of the inner parts of the machine between two different types (flavors) of hot drinks to avoid the mixture of different flavors (cocktail effect). An example: When a hot chocolate and a soup can be produced in the same machine, it makes sense to use a cleaning capsule between the two hot drink capsules.

This invention of the cleaning capsule cannot only be used with machines for hot drinks. The cleaning capsule might also be used for machines that are able to produce hot drinks as well as cold drinks (e.g. iced tea or coffee).

Other advantages and attributes result from the following description of an execution example of the invention. The standard format of the capsule described in this invention involves a spool with conical flanges and a ground, which build together a hollow space. In this invention document the term "capsule" can be extended to any forms of packaging, which are suitable to be used in the relevant part of machines for hot drinks, where the hot water infuses the powder of the drink. All forms of packaging, like pads or filter bags are imaginable, which keeps the product (cleaning and filling material) contained during the working process.

The term "machines for hot drinks" includes coffee machines as well as machines for other types of hot drinks like tea, chocolate or soup and machines for cold drinks. The machines for hot drinks do not just collect contaminates by the flow of the water, but the inner part of the machines also are contaminated by the flow of the particular hot drink. Especially the coffee grinds remain in the wet part of the machines. These contaminations don't just affect the function of the inner part of the machine, but also the taste of the various drinks. The invented cleaning capsule provides complete removal of the contaminants described before. For this purpose there is both the filling material and the cleaning material in the hollow space of the cleaning capsule. The filling material has the function to fill up the hollow space of the capsule in order to stabilize its form. If the hollow space would be filled with cleaning material, there would be an overdose or the cleaning material would have to be further fluxed.

The filling material is inert when in contact with hot water, which means it is water insoluble. For this purpose organic, inorganic or synthetic granulates can be considered, e.g.: spelt, peelings, cellulose, Styrofoam, plastic, sand, clinker, wood fiber or other fibers. If the size of these chosen granulates or powder of the filling material is identical to the beverage capsules, the flow of the hot water can be both controlled and uniform. The resistance to the flow of the hot water in the cleaning capsule should be similar to the resistance of a coffee capsule, which leads to an exceedingly effective and successful cleaning. This allows the hot cleaning liquid to catch all contaminants in the inner part of the machine.

The same use, but other individual optimizing by experiments is thinkable for machines, which are not meant for coffee, but are specialized for alternative drinks like tea or others. The flow resistance is ideal, when the filling material has similar swelling characteristics as coffee powder. The swelling factor of the filling material in contact with water is advantageously from 1.1 up to 1.8 to the volume of the waterless powder or granulates.

The cleaning material typically will have a different powder density than the filling material. As a consequence these two materials separate within the hollow space of the capsule. The cleaning material is adhered on the surface of the filling material to avoid the separation described before. A homogeneous coating can be achieved, when the cleaning material is sprayed on the filling material. The cleaning material will dissolute in contact with hot water.

The cleaning material shall on one hand dissolve all possible types of contaminations, on the other hand it cannot be dangerous when somebody would drink it by chance.

The cleaning material contains surfactants, soda producing water-soluble substances, and chalk solving complex builder. The dose of the cleaning material has to be limited. All cleaning material must be eliminated from the capsule in one rinsing process, so that only the filling material remains in the capsule. A second rinsing process could help to rinse the inner parts of the machine again. The capsule can be removed or not from the machine for the second rinsing process.

The composition and the dosing of the cleaning and filling material have to be defined by experiments individually for each beverage system. The cleaning capsule can be used for a cleaning process between two different types of hot drinks to avoid cocktail effects. Several security features are thinkable for a save use of the cleaning capsule, e.g. the surface of the capsule can have a signal color, which makes a clear difference to a coffee capsule. A food color, which has to be drinkable, could be added to the cleaning and filling material. This would remind or warn the user optically not to drink the cleaning water. The weight of the cleaning capsule could be different to a coffee capsule by using a filling material, which has a strongly different density. The cleaning capsule could be wrapped in an additional foil. In this case the user would have to do an unusual unwrapping process. All these security features can help to protect the user from drinking the cleaning water. But even if the user would drink it, the cleaning water is in maximum caustic. It is absolutely harmless and not unhealthy.

The invention claimed is:

1. A method of cleaning an inner part of a hot beverage system, comprising:
   inserting a cleaning capsule into a hot beverage system, the cleaning capsule comprising:
   a capsule defining a hollow space containing a cleaning material and a chemically inert filling material, the filling material configured to permanently occupy the hollow space with filling material during a cleaning process; and
   performing a rinsing process to eliminate the cleaning material.

2. The method of claim 1, wherein the filling material comprises a solid matter that swells when coming into contact with water.

3. The method of claim 2, wherein the filling material when coming into contact with water is capable of swelling to occupying a volume being larger than a volume of the hollow space.

4. The method of claim 3, wherein the filling material in a dry state is capable of swelling 1.1 to 1.8 times in volume when contacted with water.

5. The method of claim 1, wherein a flow rate resistance of water through the capsule approximately equals a flow rate resistance of water through a capsule filled with ground coffee.

6. The method of claim 1, wherein the filling material comprises a water insoluble, inorganic or organic substance.

7. The method of claim 6, wherein the filling material comprises an organic material comprised of organic fibers or comprises a synthetic material.

8. The method of claim 1, wherein the filling material is in a granulate form.

9. The method of claim 1, wherein the filling material is a carrier material for the cleaning substance.

10. The method of claim 9, wherein the cleaning material adheres to a surface of the filling material.

11. The method of claim 1, wherein the capsule comprises an enforced casing that substitutes a stabilizing effect of the filling material to the capsule.

12. The method of claim 1, wherein the cleaning material releases oxygen when contacted with water.

13. The method of claim 1, wherein a portion of the cleaning material in the hollow space is less than 3 g.

14. The method of claim 1, wherein a composition of the filling material and the cleaning material holds a powder density of less than 1 g/cm$^3$ or larger than 2 g/cm$^3$.

15. The method of claim 1, wherein a composition of the filling material and the cleaning material holds a powder density of less than 0.5 g/cm$^3$ or larger than 4 g/cm$^3$.

16. The method of claim 1, wherein the cleaning capsule comprises a signal color.

17. The method of claim 1, wherein the filling material fills at least 90% of the hollow space volume.

18. The method of claim 1, wherein the cleaning material is provided in an amount so that when the capsule is substantially filled with hot water a weight concentration of the cleaning material is approximately 0.3 to 2 weight percent of the cleaning material to the hot water and filling material.

19. The method of claim 1, wherein when the capsule is substantially filled with hot water a volume of the hot water approximately equals 0.5 to 3 times a volume of water containing an extracting agent that is to be fed through the capsule.

\* \* \* \* \*